Figure 1:
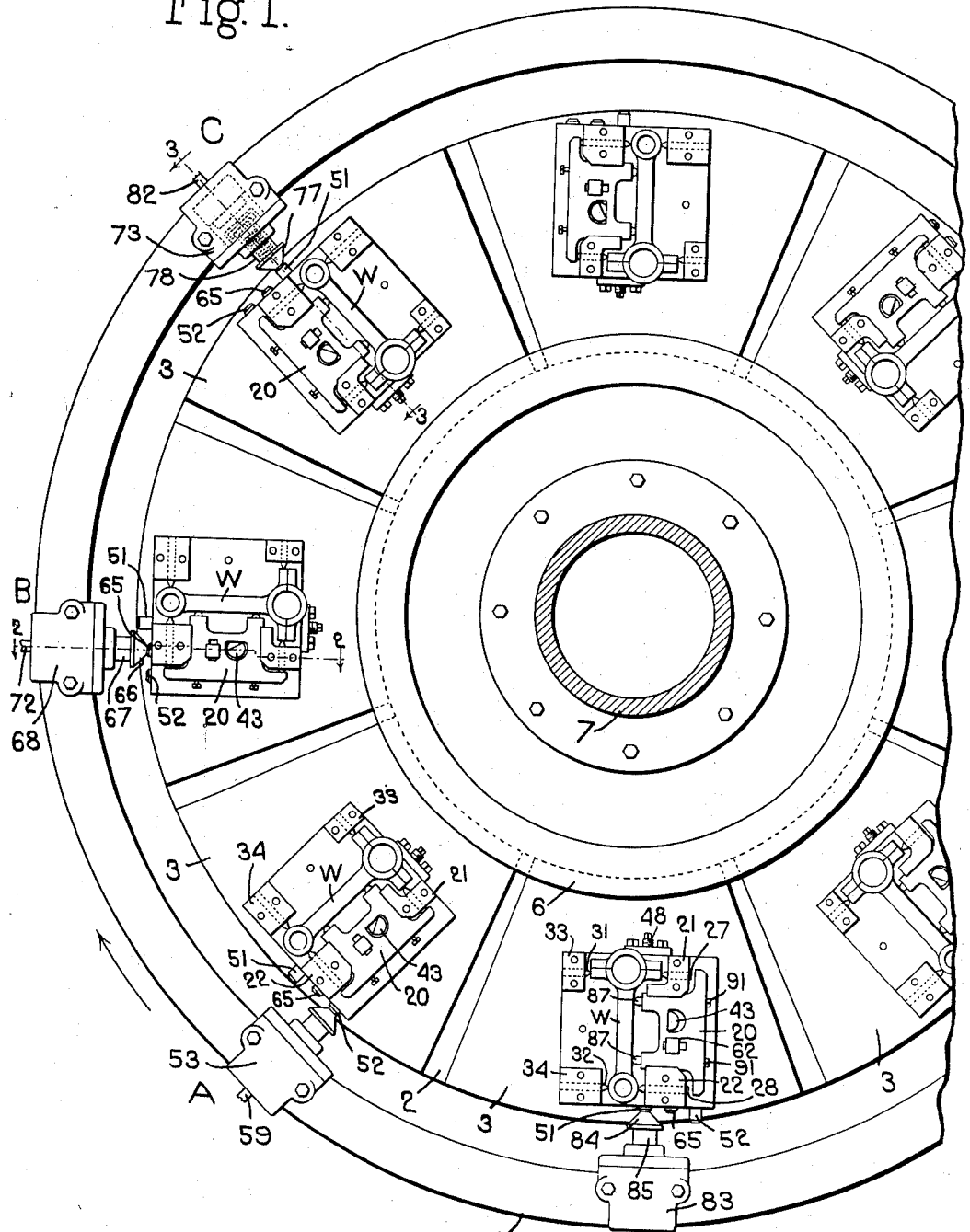

June 12, 1934.                R. M. LOVEJOY                 1,962,567
            WORKHOLDING MECHANISM FOR MACHINING OPERATIONS
                    Filed June 1, 1931        3 Sheets-Sheet 1

Inventor.
Ralph M. Lovejoy
by Heard Smith & Tennant.
                        Attys.

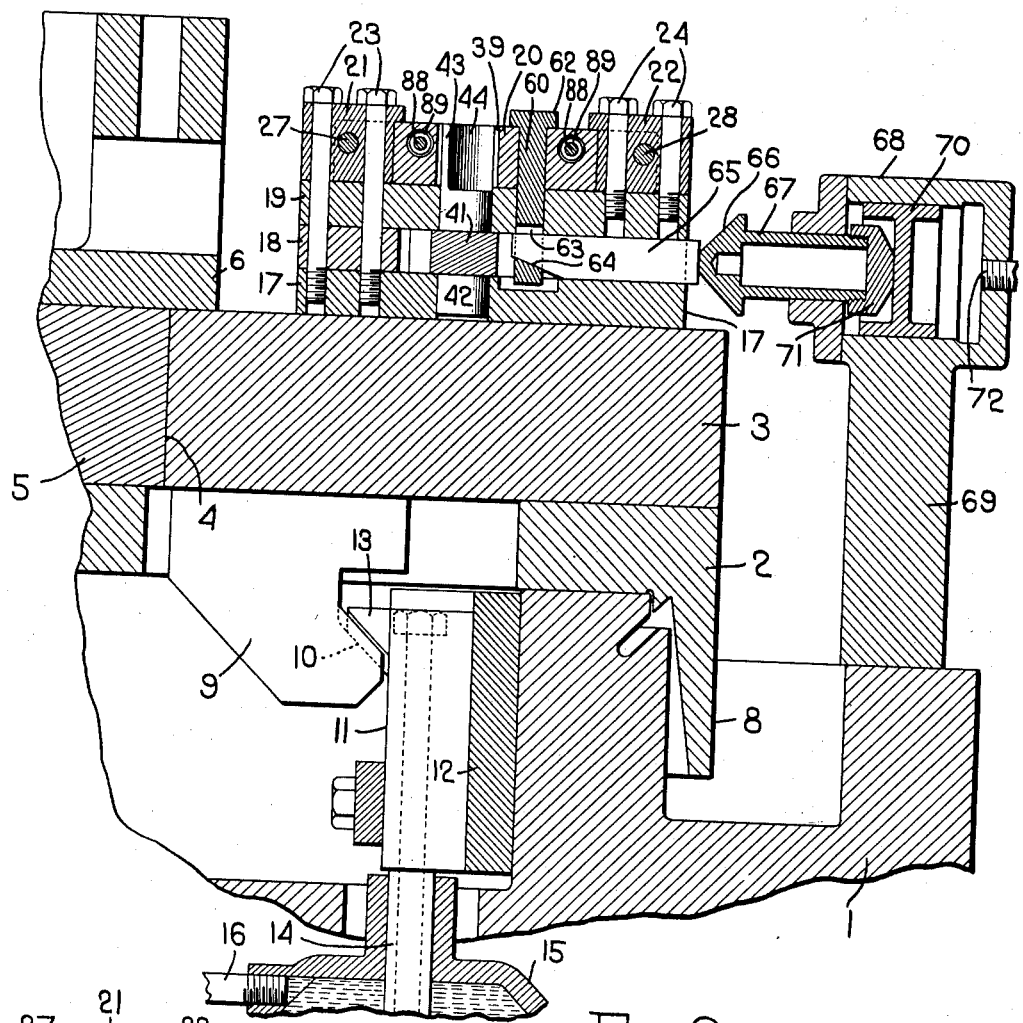
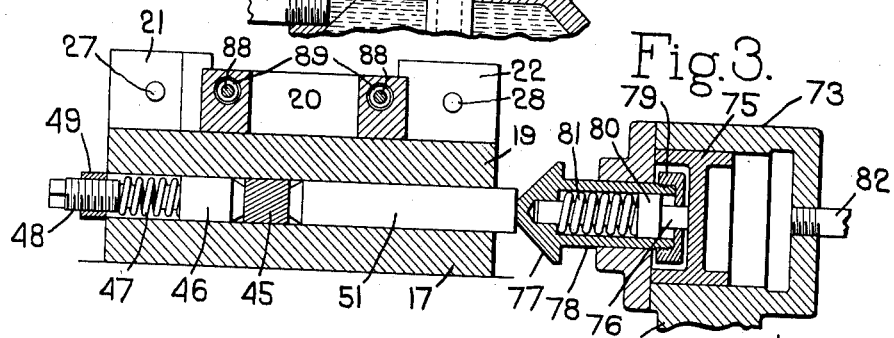

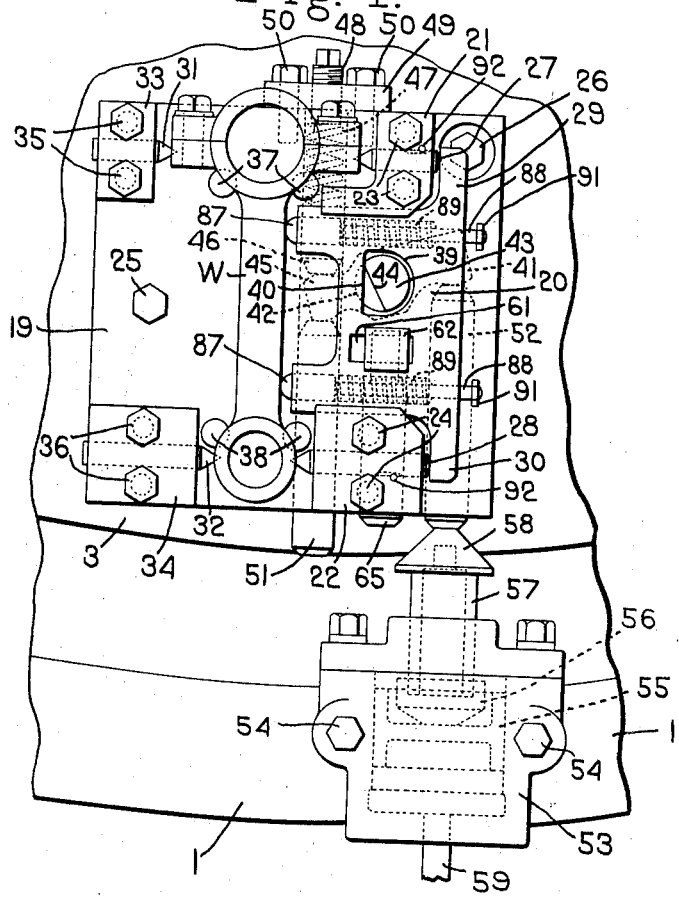
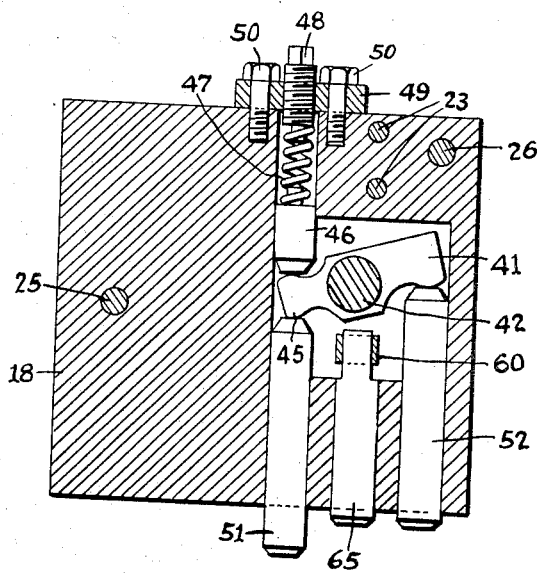

Patented June 12, 1934

1,962,567

UNITED STATES PATENT OFFICE 1,962,567

WORKHOLDING MECHANISM FOR MACHINING OPERATIONS

Ralph M. Lovejoy, Boston, Mass.

Application June 1, 1931, Serial No. 541,347

14 Claims. (Cl. 77—63)

This invention relates to improvements in work-holding jigs operable to clamp the work for machining operations, and the principal object of the invention is to provide a work-holding jig comprising relatively movable clamping means, with selectively operable means for causing relative movement therebetween to cause the same to clamp the work with great force for rough machining, or with relatively less force for subsequent operations, and preferably with a minimum force for final finishing operations.

In order to provide for rapid, economic and accurate work in machining work upon machines, particularly automatic machines comprising drilling mechanism, reaming mechanism, and finishing mechanism, it is desirable that the work shall be clamped with great force during the rough machining operation in order that heavy cuts by a suitable tool may be produced. Such clamping by heavy pressure, however, so distorts the work that subsequent operations, made by a tool having a lighter cut, such as a diamond drill, or by grinding and polishing, will be inaccurate when the heavy clamping pressure is relieved. The present invention contemplates, therefore, the provision of means for clamping the work with great force during rough machining, and with a less predetermined force for subsequent operations, such as light boring or reaming, and with a minimum force during the final finishing and polishing operations.

Broadly, the invention comprises a workholding jig having means, for continuously clamping the work, from start to finish of a plurality of operations, operable to clamp the work with varying degrees of pressure.

The invention is adapted to be used on any machine in which the work is clamped either at a single station or moved from one station to another for the successive operations.

A further object of the invention is to provide a work-holding jig comprising clamping members with resilient means normally tending to clamp the work with a predetermined force, with means operable at a certain station or stations for applying supplemental force to the clamping mechanism, while permitting the work to be clamped at another station or stations by the predetermined resilient, relatively less force during the lighter operations.

A further object of the invention is to provide means for reducing the pressure applied by the spring-actuated clamping means to the work at the final or finishing operations to such an extent that any distortion of the work by the clamping means will be avoided.

Another object of the invention is to provide means at a loading station for releasing the pressure upon the clamping means to permit the removal and replacement of the work piece.

Any suitable means may be employed for accomplishing this purpose. Preferably, however, hydraulically operable means are provided at the desired stations for exerting the supplemental clamping force, for reducing the pressure applied by the clamping means, and finally for releasing the pressure applied by the resiliently actuated means.

In operating upon delicate work it is desirable to release the pressure at certain of the stations in order to enable the piece to resume its normal condition and consequently releasing means may be employed at such stations as may be desirable.

While the invention may be employed in connection with drilling machines, or any other suitable type of machines to which it is applicable having a single tool station, it is particularly adapted to automatic machines in which the work is operated upon at a plurality of tool stations, in which case the jigs are mounted upon a suitable travelling carrier, with means for locking the carrier with the work positioned at the respective tool stations, together with suitable means for applying supplemental pressure to the clamping means, or for releasing the clamping means as the case may be at certain of the stations.

Under certain circumstances it is desirable that the supplemental power applied to the clamping means shall not exceed a predetermined force, in order to prevent undue distortion or breakage of the work piece, and the invention also provides suitable means for accomplishing this purpose.

These and other objects and features of the invention will more fully appear from the following description and the accompanying drawings, and will be particularly pointed out in the claims.

The invention is illustrated herein as embodied in a machine of the type disclosed in Patents Nos. 1,799,594 and 1,799,595, granted April 7, 1931 to Ralph M. Lovejoy, in which, Fig. 1 is a plan view of a travelling carrier in the form of a rotatable table having mounted thereupon a plurality of jigs, with means located at certain of the stations for performing the functions above described;

Fig. 2 is an enlarged radial sectional view, on line 2—2 Fig. 1, through the table, the jig mounted thereupon, the means for locking the table at a tool station, and hydraulically operable means for locking the spring-actuated clamping means in position to exert a predetermined pressure upon the clamp;

Fig. 3 is a vertical radial sectional view, on line 3—3 Fig. 1, through one of the jigs, and the hydraulic means for exerting supplemental pressure upon the clamping means, and illustrating means whereby the pressure thus applied cannot exceed a predetermined force; and, Fig. 4 is an enlarged plan view of one of the jigs showing the hydraulic mechanism exerting a supplemental force upon the clamping mechanism.

Fig. 5 is a view, mainly in horizontal section, through the intermediate plate which supports the power transmitting plate, showing in full lines the lever mechanism for actuating the power transmitting plate and the means for applying power to the lever-actuating mechanism.

The mechanism illustrated in the accompanying drawings shows the invention as applied to a drilling, or other, machine of the type disclosed in the prior patents to Lovejoy above identified, and comprises a base 1 having mounted thereupon a rotating carrier or table 2 which is indexed in any suitable manner, as disclosed in the aforesaid patents, to present the work successively at a plurality of tool stations. Sector-shaped work supports 3, which are slidably mounted upon the carrier or table 2, are provided with carefully finished arcuate inner ends 4 which abut against a central rigid cylinder 5 mounted upon or formed integral with the central column as disclosed in the aforesaid patents. The arcuate ends 4 of the work supports underlie a protecting collar or sleeve 6 which is mounted upon the central column 7. The base 1 is provided with an annular recess into which an annular skirt or apron 8, integral with and depending from the table 2, projects to prevent the entrance of dust, chips, or the like, between the under face of the table and the base 1.

Means are provided for locking each of the sector-shaped work supports in proper position at the several tool stations. In the preferred construction illustrated each work support has secured to its under face a downwardly extending boss or bracket 9 having a recess in its edge provided with a downwardly and outwardly inclined V-shaped groove 10. At each tool station hydraulic locking means are provided comprising a plunger 11 slidably mounted in suitable guides 12. The upper end of the plunger has an inwardly projecting nose 13, the under surface of which is of V-shape complementary to the V-shaped groove 10 of the boss or bracket 9. The lower end of the plunger is provided with a piston rod 14 which is secured to the piston, (not shown), of a hydraulic cylinder 15 which is supplied with fluid under pressure through a suitable pipe 16.

In the operation of the device, when the table is indexed in such a manner as to present the work at a tool station, hydraulic pressure is applied through the pipe 16 to the cylinder 15, thereupon forcing the piston downwardly and causing the nose 13 of the plunger 11 to engage the V-shaped groove 10 of the bracket 9, thereby moving the sector-shaped work support inwardly until its arcuate inner face 4 engages the surface of the cylinder 5, thereby properly positioning the work support radially. The downward movement of the plunger nose 13 also firmly clamps the work support 3 upon the table 2, and also locks the table firmly in indexed position.

This mechanism is more fully disclosed in the patents above mentioned.

The jigs for the several work-supporting sectors may be and desirably are identical, though the form and construction of the same may be varied within the scope and meaning of the claims. Each jig, as illustrated herein, desirably comprises a base plate 17, an intermediate plate 18, which is provided with slots extending inwardly toward the center of the machine from the outer edge to receive the actuating mechanisms hereinafter described, and an upper plate 19 upon which is slidably mounted a power-transmitting member or plate 20.

The power-transmitting plate 20, which is slidably mounted upon the upper plate 19 of the jig, is held in place and guided by blocks 21 and 22. Bolts 23, extending through the block 21, the upper plate 19, and the intermediate plate 18, are screw threaded into the base plate 17, thereby clamping them all together. The guide block 22 is secured to the upper plate 19 by bolts 24. Suitable bolts 25 and 26, (see Fig. 4) extending through the upper plate 19, the intermediate plate 18, and the base plate 17 of the jig, and anchored in the sector 3, firmly secure the jig to the sector.

The guide blocks 21 and 22 are bored horizontally to provide guideways for centering pins 27 and 28 provided with conical points to engage the work piece. The power-transmitting member or plate 20 has lateral extensions 29 and 30 which extend over the outer ends of the centering pins 28, so that when the block 20 is moved toward the work, the centering pins will engage the work, which is illustrated herein as the connecting rod W of an automobile.

Complementary clamping members, desirably also in the form of centering pins 31 and 32, are rigidly secured respectively in blocks 33 and 34 which are bolted down upon the upper surface of the upper plate 19 by bolts 35 and 36 which extend through the blocks 33 and 34 respectively, thence through the upper plate 19, and intermediate plate 18, and are anchored in the lower plate 17 by screw threaded connection. Desirably the upper plate 19 is provided in proximity to the tapered ends of the centering pins with pairs of bosses 37 and 38 which extend upwardly a short distance above the surface of the plate and are carefully finished to present horizontal surfaces adapted to support the work in approximately the position in which it is to be clamped by the centering pins.

The work piece W is provided with conical centering recesses to receive the ends of the centering pins which, when the work is inserted, desirably are slightly below the axial plane of the four centering pins, so that when the work is clamped by the movable centering pins, the engagement of the ends of the pins of the centering recesses in the work will raise the work piece slightly, so that it is freed from contact with the bosses 37 and 38 and supported wholly by the clamping centering pins.

The actuation of the movable centering pins 27 and 28 to clamping positions desirably is accomplished by a mechanism exerting a predetermined resilient pressure upon the power-transmitting means or plate 20. In the construction illustrated herein the power transmitting plate 20 is provided with a recess 39 having an outer cylindrical face and an inner flat face 40.

A lever 41, having a cylindrical hub 42, is fulcrumed in the plates 17 and 19, (see Fig. 2) and is provided with an upwardly extending integral hub or shaft 43 which is slabbed off to present a flat face 44, (see Fig. 4), adapted to co-operate with the flat face 40 of the recess 39 in the power-transmitting plate 20 and which, when the shaft is rotated by the swinging of the lever 41, will act as a cam to force the power-transmitting plate inwardly.

The power-transmitting lever 41 is provided with an extension or arm 45 which is engaged by a plunger 46 slidably mounted in a slot in the intermediate plate 18 and which is actuated by a helical spring 47, the outer end of which is engaged by an adjusting screw 48 which is mounted in a plate 49 secured to the side of the intermediate plate by bolts 50. This spring acts normally to swing the lever arm 45 in a direction to cause the cam produced by the flat face 44 of the upwardly extending hub of the lever to force the power-transmitting plate 20 inwardly, so that the ends of the extensions 29 and 30 of said plate will press respectively upon the outer ends of the centering pins 27 and 28 and force the same into engagement with the work, thereby clamping the work against the stationary centering pins 31 and 32.

Suitable means are provided for swinging the arm 45 of the lever 41 in a reverse direction to release the pressure of the cam portion of the hub 43 of the lever upon the power-transmitting plate. As illustrated herein this means comprises a plunger 51 which is slidably mounted in a slot in the intermediate plate 18 and abuts against a face of the arm 45 of the lever 41 opposite to the face which is engaged by the plunger 46. Suitable means for actuating this lever to relieve the pressure upon the work piece are provided and as illustrated herein are located at a predetermined work station or stations.

The means for applying supplemental force to the clamping mechanism illustrated herein comprises a plunger 52 which is slidably mounted in a suitable recess in the intermediate plate 18 and abuts at one end against the outer end of the lever 41 and at its other end extends beyond the end of the jig in such a manner as to be engaged by suitable actuating mechanism located at the rough machining station A, such as the plunger of a hydraulic ram by means of which a very great force may be applied to the clamping mechanism to hold the work piece firmly during rough machining.

In the construction illustrated herein the hydraulic ram comprises a cylinder 53 which is secured by bolts 54 to the outer portion of the base 1 of the machine at a desired tool station. The cylinder of the ram is provided with a piston 55 having a central web which engages a block 56 at one end of a plunger 57, the other end of which is provided with a conical head 58 adapted to engage the end of the plunger 52 which engages the lever 41. A suitable pipe 59 is provided to supply fluid under pressure to the cylinder of the ram.

In the application of supplemental power to the clamping mechanism therefore, hydraulic pressure is supplied through the pipe 59 to the cylinder 53, thereby forcing the piston 55 inwardly and causing the head 58 of the plunger 57 to engage and force the plunger 52 inwardly, thereby swinging the arm 41 in a direction to cause the cam-shaped end of the hub 43 of the lever to force the power-transmitting plate 20 inwardly, (to the left Fig. 4) thus forcing the movable centering pins 27 and 28 against the work piece with great force, so that the work piece is clamped by very great power between the movable and stationary centering pins, thereby enabling rough cuts to be made upon the work piece without danger of displacement of the work piece, or inaccuracy of the cut, whether the work upon the piece is produced by rough boring, milling, or otherwise.

As before stated, it is desirable that the heavy clamping pressure upon the work be relieved to permit restoration of the work piece, by reason of its natural resilience, to its normal condition from any distortion which has been effected by the heavy clamping pressure. When, therefore, the rough machining operation is completed, hydraulic pressure introduced through the pipe 59 is relieved and the work maintained in clamped position by the action of the spring 47 upon the plunger 46 which in turn acts upon the arm 45 of the lever 41, the cam-shaped hub 43 of which forces the power-transmitting plate 20 in a direction to clamp the work.

During the subsequent lighter machining operations, such as reaming, final drilling with a diamond drill, or grinding and polishing operations, the work is held by the spring actuated clamping means above described.

In order that uniform clamping pressure may be maintained upon the work during such lighter machining as reaming and the like, means are provided for clamping the power-transmitting plate against movement, thereby avoiding any possible movement of the power-transmitting plate against the action of the spring 47. The mechanism for accomplishing this purpose comprises a locking member 60, preferably in the form of a rectangular bar, which extends vertically downwardly through a rectangular slot 61 in the power-transmitting plate 20, and is provided at its upper end with a head 62 wider than the slot which engages the upper surface of the power-transmitting plate. The lower end of the locking bar 60 is provided with a recess 63 having an inclined lower wall 64 which is engaged by a complementary inclined surface upon a pressure bar 65 which is slidably mounted in a slot in the intermediate plate 18, and is adapted to be engaged by the head 66 of the plunger 67 of a hydraulic ram (see Fig. 2), which preferably is located at the next station B, such as the station at which reaming is performed. The hydraulic ram comprises a cylinder 68, mounted upon or formed integral with a stand 69 which is mounted upon the base 1 and is provided with a piston 70 which engages a block 71 upon the end of the plunger 67. Hydraulic pressure is supplied to the cylinder through a suitable pipe 72.

When, therefore, hydraulic pressure is supplied to the cylinder, the plunger 67 is forced inwardly, thereby causing its head to move the pressure bar 65 inwardly, thus causing its inclined end to draw the locking bolt 60 downwardly and firmly clamp the power-transmitting plate upon the upper surface of the upper plate 19 of the jig.

By reason of this construction the movable centering pins 27 and 28 are held unyieldingly in position to maintain the predetermined pressure previously applied by the spring 47 throughout the reaming operation. By reason of the adjustability of the screw 48, which abuts against the outer end of the spring 47, any predetermined pressure within the capacity of the spring may have been applied to the power-transmitting means before the power-transmitting plate is thus clamped. By reason of this construction therefore any work piece may be held with the proper pressure during such reaming operation.

For the final finishing operation, such as drilling by a diamond drill, grinding or polishing, in which a very light cut upon the work is taken, it may be desirable further to relieve the pressure of the clamping means upon the work, so that the internal forces within the metal itself may overcome any distortion of the work piece which has been produced by the previous clamping operation. In order to accomplish this purpose, means may be provided to decrease the clamping force applied by the spring 47 through the power-transmitting plate to the clamping means which, as illustrated herein, are the centering pins, thus enabling the clamping means to hold the work with such minimum force as will prevent displacement of the work without producing any distortion of the work.

The mechanism for accomplishing this purpose, as illustrated herein, comprises a hydraulic ram comprising a cylinder 73 carried by a stand 74 mounted upon the base 1 at the finishing tool station C. The cylinder 73 of the ram is provided with a piston 75, of the character above described, the web of which is adapted to engage a rod 76 through which predetermined resilient pressure is transmitted to the head 77 of the plunger 78 of the ram. As illustrated in Fig. 3 the rod 76 is journalled at one end in a cap 79 threaded upon the inner end of the plunger 78 and at its other end is journalled in the head 77 of the plunger. The rod 76 is provided with an enlarged cylindrical boss 80 at its inner end which engages one end of a spring 81 which is mounted upon said rod and at its other end engages the inner wall of the head of the plunger 77. The plunger of the hydraulic ram is so positioned as to engage the end of the plunger 51 which acts upon the arm 45 in opposition to the spring-pressed plunger 46.

The spring 81 of the plunger 78 is of a strength so proportional to that of the spring 47 as to overcome a predetermined portion of the force of the spring 47, so that upon actuation of the plunger 78 through hydraulic pressure introduced into the cylinder 73 through a suitable pipe 82, such predetermined pressure may be applied through the plunger 78 as partially to compensate the pressure applied by the spring 47 through the power transmitting plate 20 to the clamping means, such as the centering pins 27 and 28, so that the work will be clamped as gently as possible during the final finishing operation.

Of course, any of the several tool stations may be provided with mechanism of the character above described for clamping the work with great pressure for rough machining or the like, for clamping work with reduced pressure for reaming, and such lighter operations, and for clamping the work with a minimum pressure for final finishing operations.

In order to relieve the internal stresses in the work, produced by distortion due to the clamping of the work, and thereby restoration of the work piece to its normal position, certain of the stations, intermediate of the rough machining station and other stations at which the work is forcibly clamped, may be provided with means operable partially to compensate the pressure applied by the spring-actuated means, thus minimizing the fatigue of the metal which otherwise might be produced by continuous clamping force.

When the work is completed the final indexing of the travelling carrier will present the work jig at the loading station L where the finished work can be removed and a new piece introduced. Suitable mechanism is provided at the loading station for releasing the work-clamping means to permit the removal of the work. In the preferred construction illustrated herein the loading station is also provided with a hydraulic ram comprising a cylinder 83, of the character heretofore described, which is carried by a suitable stand mounted upon the base 1. The head 84 of the plunger 85 of this ram is positioned to engage the sliding bar 51 of the jig. When the plunger is actuated by hydraulic pressure, introduced through the pipe 86, the bar 51 is forced inwardly, thereby forcing the arm 45 rearwardly against the action of the spring 47 until the flat face 44 of the cam-shaped end 45 of the hub of the lever 41 is in parallelism with the wall 40 of the recess 39 in the plate 20, thus relieving all pressure upon the power transmitting plate 20. In order to remove the power transmitting plate from engagement with the movable centering pins 27 and 28, a spring-actuated plunger or plungers are mounted in the power transmitting plate and so engage the work piece that when pressure of the spring 47 is relieved the power transmitting plate will be moved outwardly away from engagement with the ends of the centering pins 27 and 28.

In the construction illustrated, plungers 87 are slidably mounted in suitable recesses in the work-supporting plate. The plungers 87 have respectively stems 88 which slidably fit suitable journals in the plate 20. The plungers 87 are slidably mounted in counterbores in the plate 20 and are normally held in extended position by helical springs 89 mounted upon the stems 88 and abutting at one end against said plungers, and at the other end against the base of the counterbore. The stems 88 are provided at their ends with nuts or stops 91 which prevent the plungers and their stems from being detached from the power transmitting plate. When the pressure is thus relieved upon the power transmitting plate by the pressure of the plunger 57 of the ram against the bar 51, the springs 89 will force the power transmitting plate out of engagement with the ends of the centering pins 27 and 28 so that the work may then be moved laterally to force the centering pins 27 and 28 rearwardly sufficiently to permit disengagement of the work from the stationary centering pins 31 and 32, thereby permitting removal of the work. In order to prevent the centering pins 27 and 28 from dropping out each of these pins is provided with a shallow recess which is crossed by a pin 92, the recess being of sufficient length to permit full effective clamping movement of the centering pins, but to prevent removal of the centering pins from the blocks 21 and 22 in which they are mounted.

It will be obvious that the hydraulic mechanism herein described may be connected to suitable controlling mechanism such as that illustrated in the patents to Lovejoy above identified, and actuated in timed relation with the locking of the work supports at the several tool stations, so that the entire mechanism is under automatic control.

By reason of the present invention therefore the work may be clamped with very great force for heavy machining, with a lighter force for less vigorous operations such as reaming, and with a minimum force consistent with properly holding the work in position for final finishing operations, thereby enabling rapid preliminary rough operation upon the work, such as rough boring, the speed of which determines the rapidity of operation of the entire machine, while enabling the work to be clamped for subsequent operations with such force as may be desired properly to hold the work during such operations, with a minimum distortion, and finally to enable the completion of the work under such light clamping pressure that no distortion of the work will be produced by the work-clamping means, thereby resulting in extreme accuracy of the finishing operation.

It has heretofore been stated that the embodiment of the invention is illustrated herein as applied to machines of the type disclosed in the patents to Ralph M. Lovejoy above mentioned. In the construction disclosed in these patents fluid-operated means, preferably hydraulic, are provided for locking the carrier and the work-supporting sectors accurately at the several tool stations, and fluid-operated, preferably hydraulic, means are employed for automatically controlling the sequence of operation of the tool-feeding mechanism and the indexing mechanism. Inasmuch as the actuation of the work-clamping mechanism of the jigs at the various tool stations desirably is accomplished simultaneously with the locking of the travelling carrier, fluid under pressure may be supplied to the hydraulic rams which are located at the several tool stations from the same source as that which supplies fluid under pressure for locking the work carrier, and preferably also the work-supporting sectors at the several tool stations. While hydraulic means desirably are employed for such purpose, it will be obvious that other fluid-operated means may be utilized, or that equivalent mechanical mechanism may be provided for producing the functions and results herein described.

It will therefore be understood that the particular embodiment of the invention is of an illustrative character and that other forms of work-clamping mechanisms suitable for the work to be operated upon, as well as the means for actuating the clamping mechanism, may be employed within the meaning and scope of the following claims.

Having thus described the invention, what is claimed as new, and desired to be secured by Letters Patent, is:

1. A work-holding jig comprising a stationary clamping member provided with centering means, co-operating movable centering means spaced apart to engage the work at points remote from each other, power-transmitting means for simultaneously actuating said movable centering means to clamp the work upon said stationary centering means, spring-operated means for actuating said power-transmitting means to clamp the work, means selectively operable to increase the force applied to said movable centering means by said spring-operated means, and spring-actuated means for withdrawing said power-transmitting means upon release of the respective power-applying means.

2. A work-holding jig comprising a base, stationary and relatively movable clamping members mounted thereon, a power-transmitting block reciprocably mounted on said base, means including a lever having a cam engaging said power-transmitting block operable to force said movable clamping members toward the stationary clamping members to clamp the work, resilient means acting upon said lever tending normally to swing the same in a direction to clamp the work with a predetermined force, hydraulic means for actuating said lever to supplement the force applied by said resilient means and thereby clamp the work with great force for rough machining, and hydraulically actuated locking means operable to maintain the force applied by the clamping members to the work at the time of actuation of said locking means.

3. A work-holding jig comprising a stationary clamping member having centering members to engage the work, co-operating slidably mounted centering members to engage the work, a power-transmitting block reciprocably mounted to engage said movable centering members, spring-actuated means normally acting to cause said power-transmitting block to force said centering members into clamping engagement with the work, selectively operable hydraulic means for supplementing the power applied to the work by said spring-actuated means to clamp the work with great force for rough machining, means operable upon release of the power applied by said hydraulic means to release the force of said spring-actuated means, and spring-actuated means carried by said power-transmitting block engaging said work operable to withdraw said power-transmitting means from engagement with said centering means to permit removal and replacement of the work.

4. A machine for presenting work at a plurality of tool stations comprising a travelling carrier, a work-holding jig mounted thereupon having resilient means to clamp the work continuously, means on said jig for applying a supplemental force to said clamping members and actuating means located at successive stations operable respectively to cause said clamping means to apply a heavy clamping force to said work at one station, and to apply progressively less clamping force to the work at succeeding stations.

5. A machine for presenting work at a plurality of tool stations comprising a travelling carrier, a work-holding jig mounted thereupon having resilient means to clamp the work continuously, means on said jig for applying a supplemental force to said clamping members and actuating means located at successive stations operable respectively to cause said clamping means to apply a heavy clamping force to said work at one station, and to apply progressively less clamping force to the work at succeeding stations, and means located at another station operable to release said clamping means.

6. A machine for presenting work at a plurality of tool stations comprising a travelling carrier, a jig mounted thereon and movable therewith provided with relatively movable co-operating work-clamping means, means for locking said carrier with the work presented successively at said tool stations, actuating means at one of said stations for causing said work-clamping means to clamp the work with great force for rough machining, and actuating means at another station for causing said clamping means to clamp the work with a predetermined lesser force for lighter machining.

7. A machine for presenting work at a plurality of tool stations comprising a travelling carrier, a jig mounted thereon and movable therewith provided with relatively movable co-operating work-clamping means, means for locking said carrier with the work presented successively at said tool stations, means at one of said stations for actuating said work-clamping means to clamp the work with great force for rough machining, means at another station for actuating said clamping means to clamp the work with a predetermined lesser force for lighter machining, and means at another station to actuate said clamping means to hold the work firmly with light clamping force for finishing operations.

8. A machine for presenting work at a plurality of tool stations comprising a travelling carrier, a jig mounted thereon and movable therewith provided with relatively movable co-operating work-clamping means, means for locking said carrier with the work presented successively at said tool stations, means at one of said stations for actuating said work-clamping means to clamp the work with great force for rough machining, means at another station for actuating said clamping means to clamp the work with a predetermined lesser force for lighter machining, means at another station to actuate said clamping means to hold the work firmly with light clamping force for finishing operations, and means at another station for releasing said clamping means from the work.

9. A machine for presenting work at a plurality of tool stations comprising a travelling carrier having a work-holding jig mounted thereon and movable therewith provided with relatively movable co-operating clamping means, spring-actuated means normally forcing said clamping means into engagement with the work with a predetermined force, and means including a lever for transmitting supplemental force to said clamping means, hydraulically operable means for locking said travelling carrier with the work presented at a tool station, and hydraulically operable means at said station for applying supplemental force to said lever.

10. A machine for presenting work at a plurality of tool stations comprising a travelling carrier having a work-holding jig mounted thereon and movable therewith provided with co-operating relatively movable clamping means, spring-actuated means normally forcing said clamping means into engagement with the work with a predetermined force, and means including a lever for transmitting supplemental force to said clamping means, hydraulically operable means for locking said travelling carrier with the work presented at said tool stations, hydraulically operable means at a tool station for applying supplemental force to said lever at said station to clamp the work with great force for rough machining and hydraulically operable means at another station operable to release said clamping means from the work.

11. A machine for presenting work at a plurality of tool stations comprising a travelling carrier having a work-holding jig provided with co-operating clamping means, spring-actuated means normally forcing said clamping means into engagement with the work with a predetermined force, fluid-operated means for locking said travelling carrier with the work presented at successive tool stations, fluid-operated means at a tool station for applying supplemental force to said spring-actuated means at such station to clamp the work with great force for rough machining, and fluid-operated means at another station for releasing power applied to said clamping means by said spring-actuated means.

12. A machine for presenting work at a plurality of tool stations comprising a travelling carrier having a work-holding jig provided with co-operating clamping means, spring-actuated means normally forcing said clamping means into engagement with the work with a predetermined force, fluid-operated means for locking said travelling carrier with the work presented at successive tool stations, fluid-operated means at a tool station for applying supplemental force to said spring-actuated means at such station to clamp the work with great force for rough machining, and fluid-operated means at a succeeding station operable to cause said clamping means to clamp the work with a predetermined lesser force.

13. A machine for presenting work at a plurality of tool stations comprising a travelling carrier having a work-holding jig provided with co-operating clamping means, spring-actuated means normally forcing said clamping means into engagement with the work with a predetermined force, fluid-operated means for locking said travelling carrier with the work presented at successive tool stations, fluid-operated means at a tool station for applying supplemental force to said spring-actuated means at such station to clamp the work with great force for rough machining, fluid-operated means at a succeeding station operable to cause said clamping means to clamp the work with a predetermined lesser force, and fluid-operated means at a later station operable partially to relieve the force applied to the work by said spring-actuated means to hold the work with light pressure for finishing operations.

14. A machine for presenting work at a plurality of tool stations comprising a travelling carrier having a work-holding jig provided with co-operating clamping means, spring-actuated means normally forcing said clamping means into engagement with the work with a predetermined force, fluid-operated means for locking said travelling carrier with the work presented at successive tool stations, fluid-operated means at a tool station for applying supplemental force to said spring-actuated means at such station to clamp the work with great force for rough machining, fluid-operated means at a succeeding station operable to cause said clamping means to clamp the work with a predetermined lesser force, fluid-operated means at a later station operable partially to relieve the force applied to the work by said spring-actuated means to hold the work with light pressure for finishing operations, and means located at another station for releasing said clamping means from the work.

RALPH M. LOVEJOY.